(12) United States Patent
Albanes et al.

(10) Patent No.: US 8,818,410 B2
(45) Date of Patent: Aug. 26, 2014

(54) ENHANCED LOCATION BASED SERVICES

(71) Applicant: AT&T Mobility II LLC, Atlanta, GA (US)

(72) Inventors: Stalin Fernando Albanes, Atlanta, GA (US); Ming-Ju Ho, Alpharetta, GA (US); Craig Mullings, Loxahatchee, FL (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/705,382

(22) Filed: Dec. 5, 2012

(65) Prior Publication Data

US 2014/0155095 A1 Jun. 5, 2014

(51) Int. Cl.
*H04W 24/00* (2009.01)
*H04W 4/22* (2009.01)
*H04W 64/00* (2009.01)

(52) U.S. Cl.
CPC ............... *H04W 4/22* (2013.01); *H04W 64/00* (2013.01); *H04W 64/003* (2013.01)
USPC ................... 455/456.1; 455/456.2; 455/456.3

(58) Field of Classification Search
CPC ...... H04W 4/22; H04W 64/00; H04W 64/003; H04W 76/007
USPC ........... 455/456.1, 456.2, 456.3, 456.4, 456.5
See application file for complete search history.

(56) References Cited

U.S. PATENT DOCUMENTS

2008/0117101 A1* 5/2008 Pan .......................... 342/357.09
2011/0177827 A1 7/2011 Crilly, Jr. et al.

\* cited by examiner

*Primary Examiner* — Jean Gelin
(74) *Attorney, Agent, or Firm* — Baker & Hostetler LLP

(57) ABSTRACT

Location information (e.g., GPS information) pertaining to the location of a device may be integrated into a distributed antenna system (DAS) to enhance location based services. This may be accomplished via a system that filters and combines GPS information with DAS information. Utilization of the enhanced location based services system may enhance accuracy performance of indoor location services and improve round-trip time (RTT) location responses associated with network assisted GPS (e.g., A-GPS) location requests for services from indoor calls.

17 Claims, 13 Drawing Sheets

ENHANCED LOCATION BASED SERVICES

TECHNICAL FIELD

The technical field generally relates to wireless communications and more specifically relates to indoor wireless location based services.

BACKGROUND

Communications devices such as cellular telephones, mobile communication devices, personal digital assistants (PDAs), laptops, and the like are becoming more prevalent as technology advances make these devices more powerful and more affordable. And with the advancements in location determination technologies, location-based services developed for communications devices are becoming extremely popular. However, when indoors, location based services may be inconsistent or nonexistent.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

In an example embodiment, global positioning system (GPS) signals may be integrated into radio frequency distributed antenna system (DAS) equipment. This may be accomplished via a real-time GPS combine and amplify system. Seamless GPS satellite signal visibility (accessibility) to any indoor GPS device may be accomplished. In addition to the relay of GPS satellite information, the GPS amplification system also may estimate altitude of a device with respect to ground level, tag antenna identification information serving the device, provide spatial (e.g., x,y,z) coordinates adjustments for navigating indoors applications, and the like. Accuracy performance of indoor location services may be enhanced by utilizing real-time global positioning system (GPS) amplification. Round-trip time (RTT) location responses associated with network assisted GPS (A-GPS) location requests for services from indoors call may be improved (shorter round-trip time).

BRIEF DESCRIPTION OF THE DRAWINGS

Reference is made here to the accompanying drawings, which are not necessarily drawn to scale.

DETAILED DESCRIPTION OF ILLUSTRATIVE EMBODIMENTS

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

Location-based services have been developed for mobile devices based on the premise that service providers are able to identify the location of mobile devices attached to their networks and provide additional services based on that location. This may be especially apropos for provision of emergency services. For example, first responders, fire fighters, police, medical personnel, or the like, may benefit from knowing the location of an individual that is in need of assistance. GPS devices being used at indoor locations however may not have direct line of sight to GPS satellites and/or may not be able to decode weak GPS satellites signals.

Figure 1:
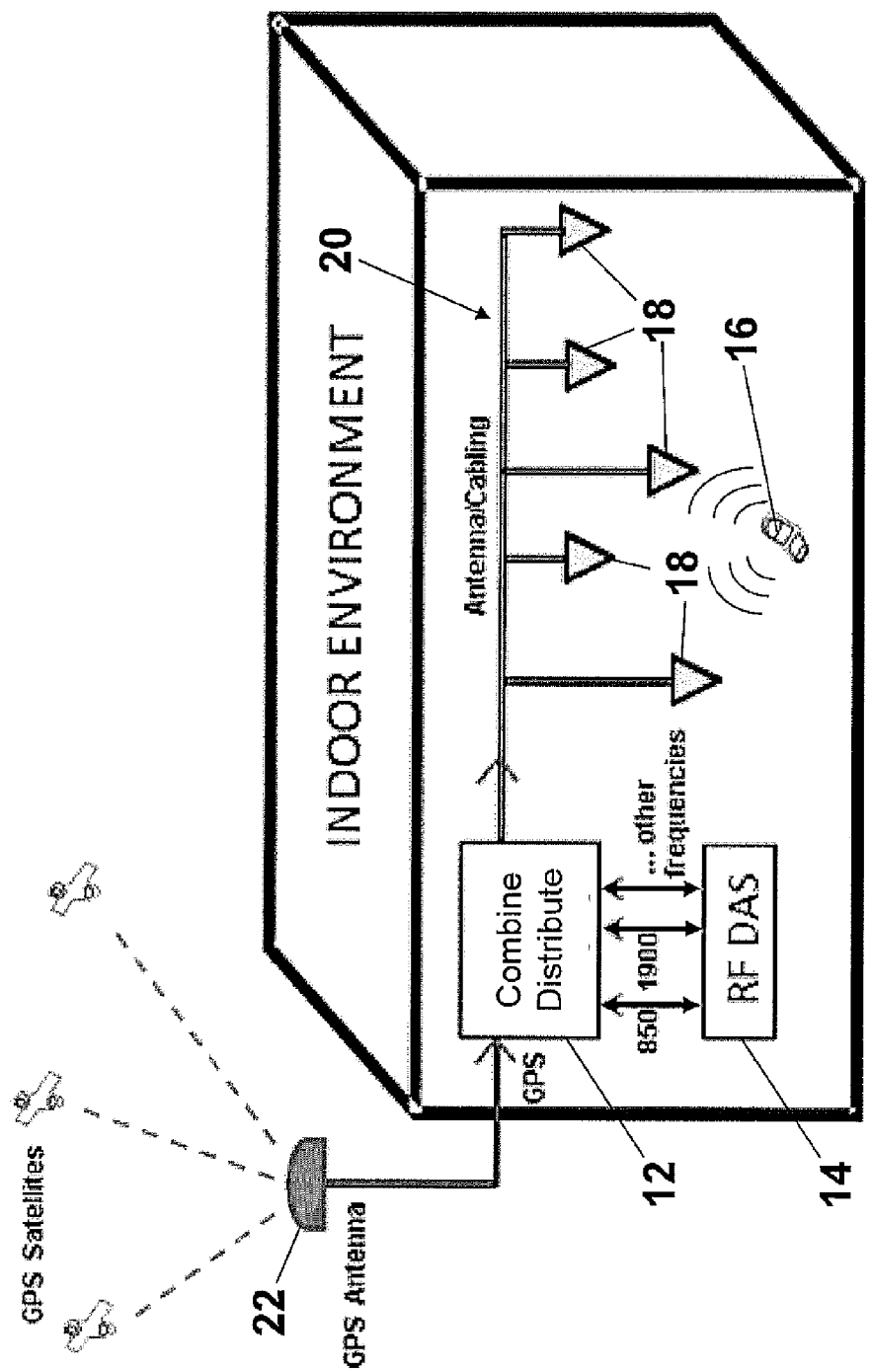
FIG. 1 illustrates an example global positioning system (GPS) combination and distribution system.

FIG. 1 illustrates an example global positioning system (GPS) combination and distribution system. As an overview, as depicted in FIG. 1, signals from GPS satellites may be received by a GPS antenna 22. The signals received from the GPS antenna 22 may be provided to a GPS combine and distribute system 12. In an example embodiment, the indoor environment depicted in FIG. 1 may have an existing radio frequency (RF) distributed antenna system (DAS) 14. The GPS combine and distribute system 12 may receive and/or provides signals from/to the DAS 14. The GPS combine and distribute system 12 may communicate with a mobile device 16 via communication infrastructure 20 and DAS transceivers 18.

In more detail, the GPS combine and distribute system 12 may be inserted into existing or new DAS 14 equipment located in a building or in an outdoor environment, and configured to receive call requests from users (of devices 16), as depicted in FIG. 1. It is to be understood that the GPS combine and distribute system 12 is not limited to indoor use. The GPS combine and distribute system 12 may be utilized outdoors. Use of the GPS combine and distribute system 12 in an outdoor environment may be beneficial when obstructions prevent access to GPS satellite signals. In an example embodiment, GPS amplification operating frequencies may comprise the L1 band (1575.42 MHz), the L2 band (1227.60 MHz), or the like, or any appropriate combination thereof. Thus, the GPS combine and distribute system 12 may provide signals via the communication infrastructure 20 at the L1 band, the L2 band, or the like, or any appropriate combination thereof.

Figure 2:
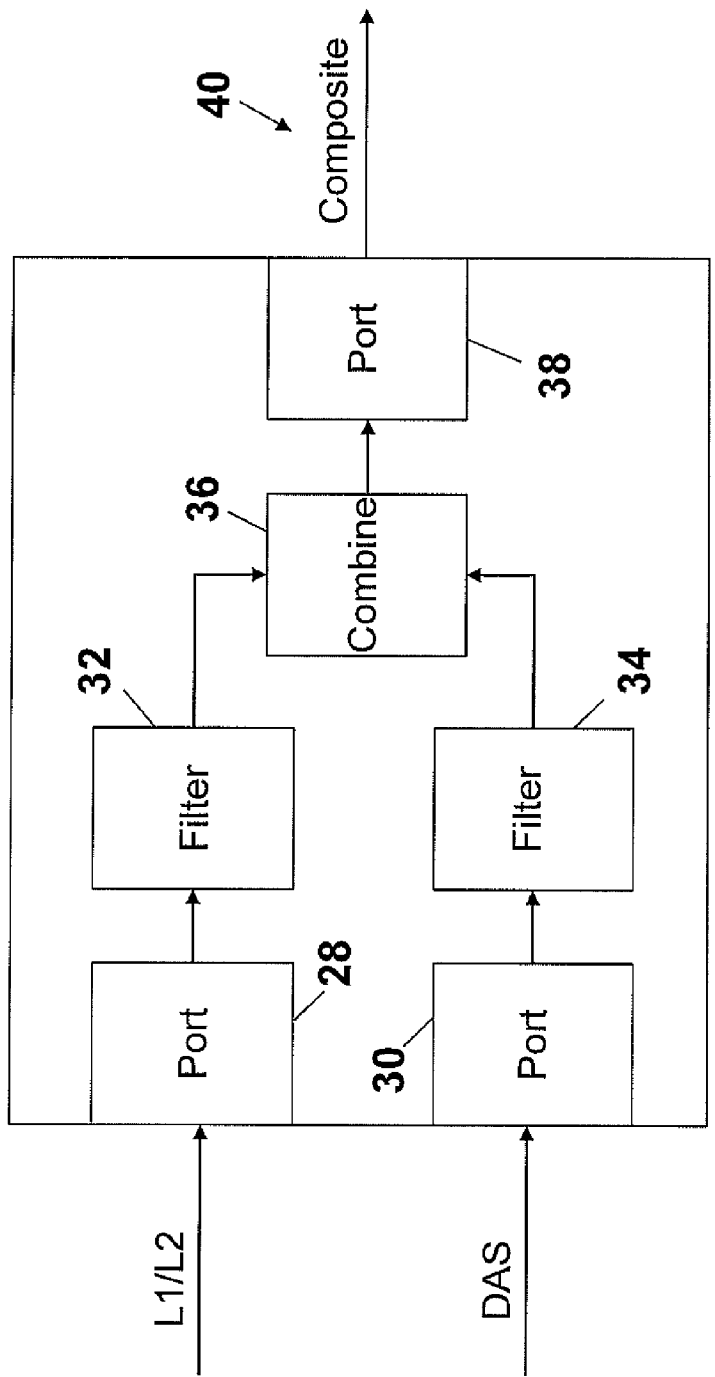
FIG. 2 is a diagram of an example diplexer 26.

FIG. 2 is a diagram of an example diplexer 26. Integration of signals at the L1/L2 frequencies bands from the GPS combine and distribute system 12 into the communication infrastructure 20 may be achieved in any appropriate manner. For example, integration of signals at the L1/L2 frequencies bands from the GPS combine and distribute system 12 into the communication infrastructure 20 may be accomplished via frequency domain multiplexing. In an example embodiment, frequency domain multiplexing may be accomplished via a frequency diplexer 26, wherein signals at the L1 band and/or L2 band may be provided in a first port 28 of the diplexer 26, signals at frequencies (e.g., 850 MHz, 1900 MHz, etc.) of the DAS system 14 may be provided in a second port 30 of the diplexer 26, the signals from the two ports may be combined by combiner 36, each occupying its respective frequency band. The combined signal 40 may be provided out via a third port 38 of the diplexer 26. In an example configuration, the diplexer 26 may comprise a filter 32 and a filer 34 for filtering the signals received from ports 28 and 30 respectively before combination by combiner 36. Filters 32 and 34 may, for example, filter out any unwanted noise from the signals from ports 28 and 30 respectively. The combiner 36 may comprise any appropriate circuitry capable of combining signal provided by filters 32 and 34. A device receiving the combined signal 40 may apply a filter, or filters, to the combined signal 40 to obtain signals at the L1, L2, and/or DAS band. In an example embodiment, each transceiver 18 may filter the combined signal as needed.

Transceivers 18 may comprise any appropriate transceiver capable of receiving and providing information. Note each transceiver in FIG. 1 is labeled with as "18" for the sake of simplicity. And it is to be understood that the number of transceivers 18 may comprise any appropriate number of transceivers (e.g., 1, 2, 5, 100, etc.). In an example embodiment, each transceiver 18 may comprise a transmitter capable of transmitting signals at any appropriate frequency. For example, each transceiver 18 may comprise a transmitter capable of transmitting signals in the L1 frequency band, transmitting signals in the L2 frequency band, transmitting signals at the DAS frequency bands (e.g., 850 MHz, 1900 MHz, etc.), and transmitting signals at any appropriate frequency to communicate with the mobile device 16. In an example embodiment, each transceiver 18 may comprise a receiver capable of receiving signals at any appropriate frequency. For example, each transceiver 18 may comprise a receiver capable of receiving signals in the L1 frequency band, receiving signals in the L2 frequency band, receiving signals at the DAS frequency bands (e.g., 850 MHz, 1900 MHz, etc.), and receiving signals at any appropriate frequency as provided by the mobile device 16. In an example embodiment, each transceiver 18 may comprise a filter capable of filter a signal into any appropriate frequency band. For example, each transceiver 18 may comprise a filter capable of filtering signals in the L1 frequency band, filtering signals in the L2 frequency band, filtering signals in the DAS frequency bands (e.g., 850 MHz, 1900 MHz, etc.), and filtering signals at any appropriate frequency as provided by the mobile device 16.

Referring again to FIG. 1, the GPS combine and distribute system 12 also may amplify signals. Thus, the GPS combine and distribute system 12 may receive GPS satellite information (signals) from the GPS antenna 22, which may reside outside of a building. The diplexer of the GPS combine and distribute system 12 may insert the received satellite information into the DAS system and may amplify and relay the DAS information and the GPS information to the mobile device 16 via communication infrastructure 20 and DAS transceivers 18.

In an example scenario, when a call is initiated via the mobile device 16, the mobile device 16 may receive assisted GPS data from a wireless operator assisted location server containing GPS satellite information. The mobile device 16 may use this information to get a position fix by tuning to the expected GPS satellites in range. This may provide seamless satellite signal visibility (accessibility) to any mobile device 16, or the like. In an example embodiment, in accordance with assisted GPS, a mobile device may contain navigation software (map, speed) use to measure satellite pseudo ranges and horizontal dilution of position to estimate a position fix. A location server (e.g., XADS) may send to the mobile device initial reference position, time reference, satellites ephemeris data and ionospheric model data. The mobile device may use this information to compute expected signal delay and Doppler values for each satellite. Next the mobile device receiver may compute its own position and velocity. Once the receiver has acquired the satellites signal and made pseudo ranges and Doppler measurements, it may use the initial location reference, time reference, and ephemeris to compute its own position and velocity. The amount of RTT computations may be reduce when the mobile device increases the number of calculated position fix as result of utilizing the GPS signals measurements.

In an example embodiment, a location of the mobile device 16 may be determined automatically when it is determined that a call being initiated by the mobile device is an emergency call. An emergency call may comprise a 9-1-1 call (e.g., called number is 9-1-1), a call to a predetermined number, a call to a number that is determined to be related to an emergency call, or the like, or any appropriate combination thereof. Predetermined numbers may comprise, for example, a list of predetermined phone numbers such as a phone number of a fire department, a phone number of an ambulance, a phone number of a police station, a phone number of a hospital, a phone number of a relative (e.g., parent, child, etc.), or the like. In an example embodiment, when the call is initiated, the list of predetermined numbers may be compared to the number being called, and if a match exists, it may be determined that the call is an emergency call. In an example embodiment, when the call is initiated, the number being called may be used to query a database, a search engine, memory, or the like to determine if the number is associated with an emergency call. For example, the number may be used to search a directory to determine to whom the number is assigned. If the number is assigned to a hospital, a police station, an ambulance service, etc., the call may be determined to be an emergency call.

Accordingly, when a call is initiated via the mobile device 16, the mobile device may analyze the initiated call (e.g., number dialed, speed dial number, name from contact list, audio input, etc.) to determine if the call is an emergency call. If the mobile device 16 determines that the call is an emergency call, the mobile device 16 may execute an application to receive assisted GPS data from a wireless operator assisted location server containing GPS satellite information. The mobile device 16 may use this information to get a position fix by tuning to the expected GPS satellites in range. The position fix (the location of the mobile device 16) may be incorporated into a communication with an intended recipient of the emergency call.

In an example embodiment, topographic information may be stored. The topographic information may be stored in any appropriate location or any appropriate manner. For example, topographic information may be stored in any appropriate memory, database, computer-readable storage medium, or the like, of the DAS 14. It is to be understood, that a computer-readable storage medium as described herein in not to be construed as a propagation signal per se. It is to be understood, that a computer-readable storage medium as described herein in not to be construed as a transient signal per se. The topographic information may comprise any appropriate topographic information, such as, topographic information pertaining to an environment proximate to the source of a call, details pertaining to the location and height of the GPS antenna 22, topographic information of the indoor environment in which the DAS 14 is located, topographic information of an outdoor environment in which a DAS may be located, construction drawings of the indoor environment in which the DAS 14 is located, a blueprint of the indoor environment in which the DAS 14 is located, or the like, or any combination thereof.

Because the GPS antenna 22 may have direct access to the GPS satellites, the location of the GPS antenna 22 may be accurate. Thus, the accurate location of the GPS antenna 22 may be correlated with the topographic information to provide an accurate location of the mobile device 16. When the mobile device is provided location information via the GPS combine and distribute system 12, appropriate topographical information also may be provided to the mobile device 16, so that the mobile device 16 may generate a map or the like indicating the location of the mobile device 16 with respect to the topographical information. The location of the mobile device 16 with respect to the topographical information may be rendered on the mobile device 16. The location of the mobile device 16 with respect to the topographical information may be rendered in any appropriate manner, such as, for example, visually, audibly, mechanically (vibration), or any appropriate combination thereof. Thus, for example, the location of the mobile device 16 may be visually rendered on a display of the mobile device 16 as an overlay on a map or the like showing what floor, what corridor, what room, etc. the mobile device 16 is located. And, the location of the mobile device 16 may move along the map overlay as the mobile device 16 moves. In an example embodiment, in addition to providing GPS satellite information, the GPS combine and distribute system 12 may estimate the altitude of the mobile device 16 with respect to ground level, tag antenna identification information serving the mobile device 16, provide spatial coordinates (e.g., x, y, z coordinates) adjustments for indoors navigation applications, or the like.

In an example embodiment, a transceiver location signal or the like may be utilized to augment location determination of the mobile device 16. For example, a location signal may be transmitted to the mobile device 16 from each of the transceivers 18. The mobile device 16 may respond to the location signal. The response from the mobile device 16 may be in the form of a broadcast. Each transceiver receiving the response may identify the time at which the response was received. This time at which each response was received along with the location of each transceiver 18 may be used to determine the location of the mobile device 16 with respect to the transceivers 18. The location of the mobile device 16 may be determined in any appropriate manner, such as, for example, time difference of arrival calculations, hyperbolic calculations, or the like. For example as a mobile device moves it may measure transmitter RF reference signals with timing advance characteristics to relocate its position. Transmitter measurements may be used to generate hyperbolas that may be superimposed to their common concentration area that may represent an estimated mobile device's location. Location signals may contain the mobile device latitude and longitude.

In another example embodiment, the mobile device 16 may augment location determination of the mobile device 16. For example, the mobile device 16 may transmit a location signal. Each transceiver receiving the location signal may respond to the location signal. Each transceiver responding to the location signal may provide an identifier indicating the its location, a self-identifier, or the like, and/or any other appropriate information. The mobile device 16 may identify the time at which each response was received. The time at which each response was received along with the location of each transceiver 18 may be used to determine the location of the mobile device 16 with respect to the transceivers 18. The location of the mobile device 16 may be determined in any appropriate manner, such as, for example, time difference of arrival calculations, hyperbolic calculations, or the like.

Figure 3:
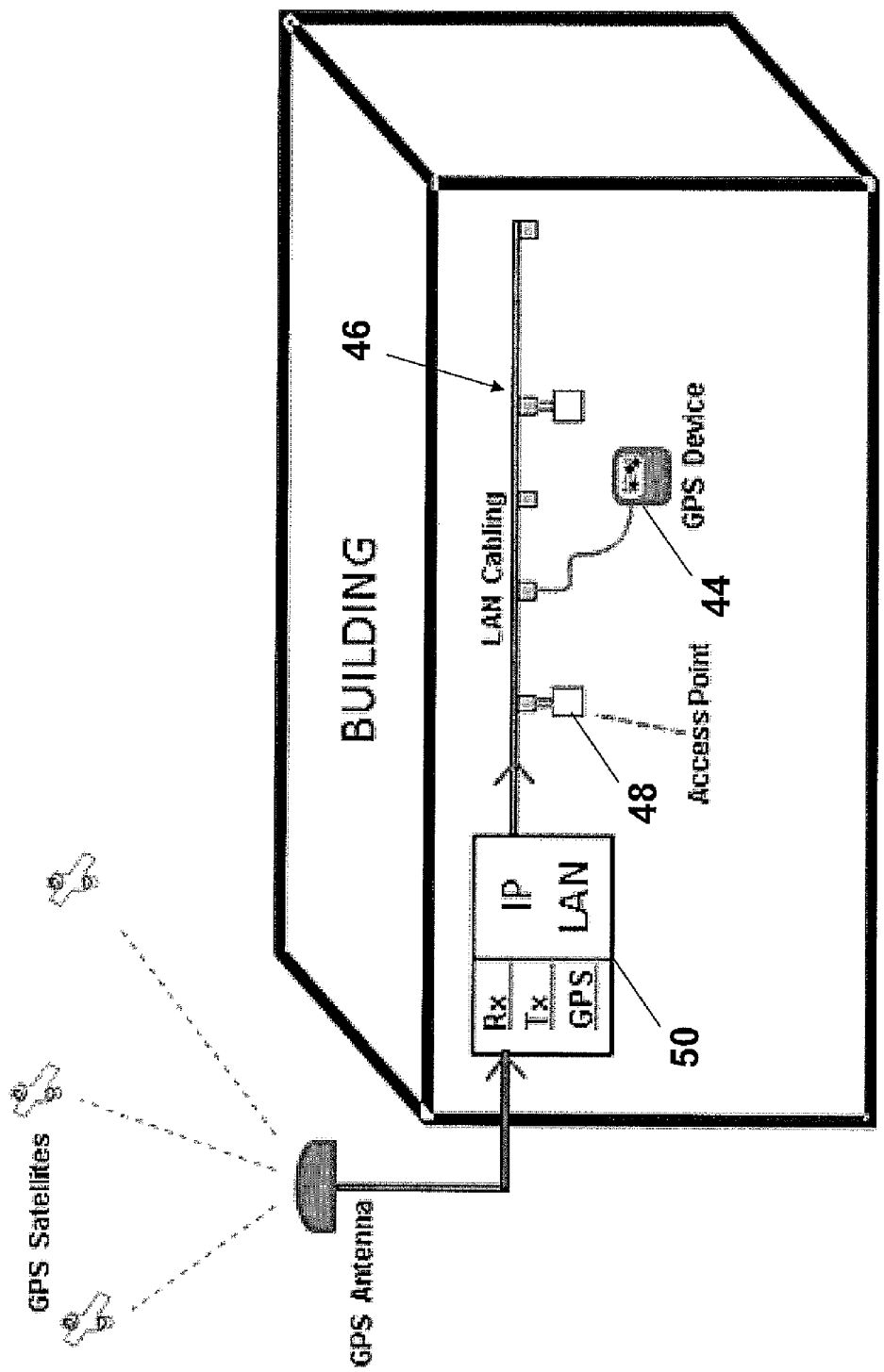
FIG. 3 illustrates an example GPS combination and distribution system 50 utilizing a local area network (LAN) distribution infrastructure 46.

FIG. 3 illustrates an example GPS combination and distribution system 50 utilizing a local area network (LAN) distribution infrastructure 46. As depicted in FIG. 3, a GPS device 44, which may comprise the mobile device 16, may be coupled to the LAN distribution infrastructure 46 via a cable, wirelessly via an access point 18, or any appropriate combination thereof. The GPS combine and distribute system 50 may operate similarly to the GPS combine and distribute system 12, however formatting of information provided to the LAN distribution infrastructure may differ from formatting of information provided to the communications infrastructure 20. In an example embodiment, the GPS combine and distribute system 50 may format information into IP packets for transmission aver the LAN distribution infrastructure 46.

In various example scenarios, the location information received from the GPS satellites may be intended to be sent to the source of a call (e.g., mobile device 16, GPS device 44, etc.). And the information for distribution via, the DAS (e.g., information provided to port 30 of FIG. 2), other than the location information, may or may not be intended for the source of the call. Thus, when the GPS combine and distribute system 12 provides combined information for distribution via the distrusted antenna system (e.g., communication infrastructure 20, transceivers 18), the intended recipient of the location information may be the source of the call and the information for distribution via the DAS may not be intended for the source of the call. On the other hand, when the GPS combine and distribute system 12 provides combined information for distribution via the distrusted antenna system (e.g., communication infrastructure 20, transceivers 18), the intended recipient of the location information may be the source of the call and the information for distribution via the DAS also may be intended for the source of the call. Similarly, when the GPS combine and distribute system 50 provides combined information for distribution via the LAN distribution infrastructure (e.g., LAN distribution infrastructure 46, access points 48, connections to the LAN distribution infrastructure 46, etc.), the intended recipient of the location information may be the source of the call and the information for distribution via the LAN distribution infrastructure may not be intended for the source of the call. And, when the GPS combine and distribute system 50 provides combined information for distribution via the LAN distribution infrastructure, the intended recipient of the location information may be the source of the call and the information for distribution via the LAN distribution infrastructure also may be intended for the source of the call.

Figure 4:
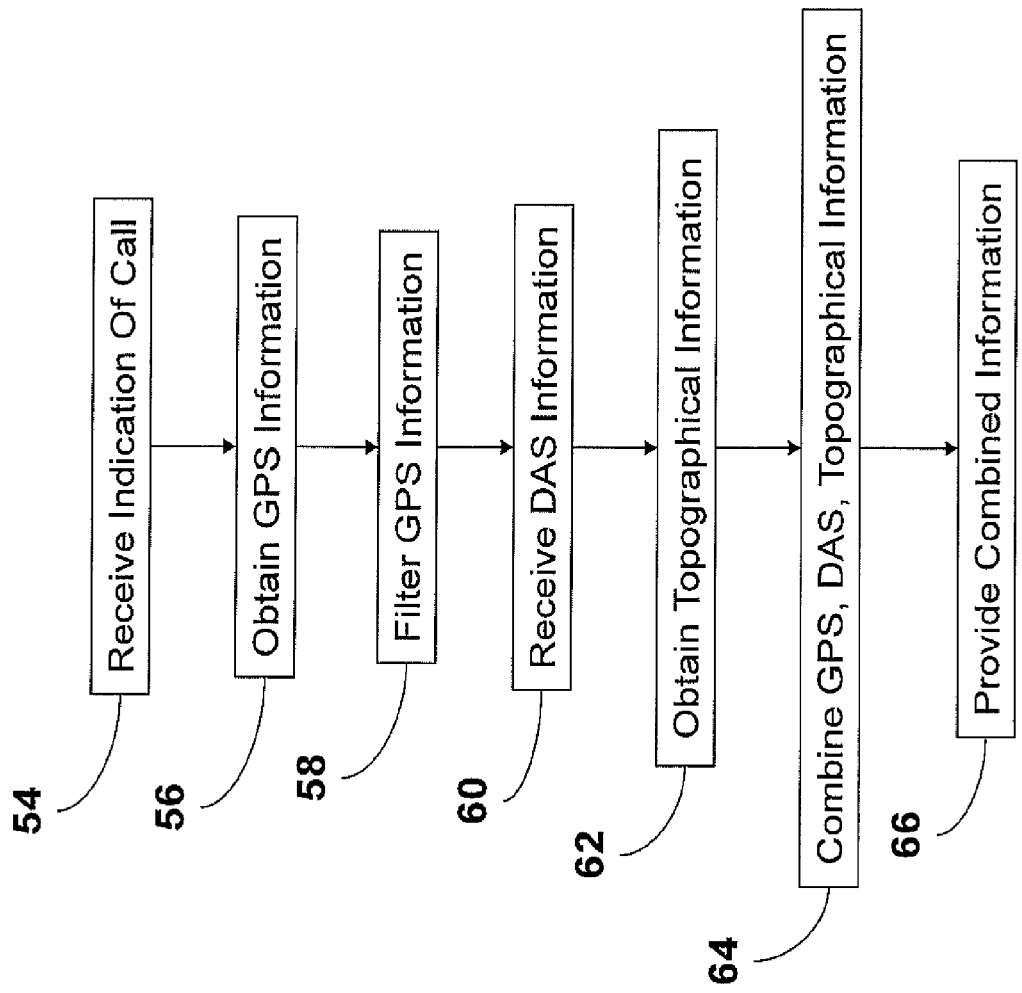
FIG. 4 is an example flow diagram of enhanced location based services. At step 54 an indication of a call may be received.

FIG. 4 is an example flow diagram of enhanced location based services. At step 54 an indication of a call may be received. The indication of the call may be received by the GPS combine and distribute system 12 and/or the GPS combine and distribute system 50 as described herein. The may have been originated by the mobile device 16 and/or the GPS device 44 as described herein. GPS information may be obtained at step 56. The obtained GPS information may comprise any appropriate GPS information as described herein, such as, for example, GPS signals from GPS satellites, assisted GPS information, or the like, or any appropriate combination thereof. Optionally, the GPS information may be filtered at step 58 as described herein. DAS information may be received at step 60. In an example embodiment, DAS information may comprise a transmitter antenna's floor number, etc. Topographical information, if any, as described herein, may be obtained at step 62. The GPS information, the DAS information, and the topographical information, may be combined at step 64 as described herein. The combined information may be provided at step 66. The combination information may be provided to the mobile device 16 and/or the GPS device 44 as described herein. The combined information may be formatted in any appropriate manner as described herein. The combined information may be distributed via a DAS distribution infrastructure and/or a LAN distribution infrastructure as described herein.

Figure 5:
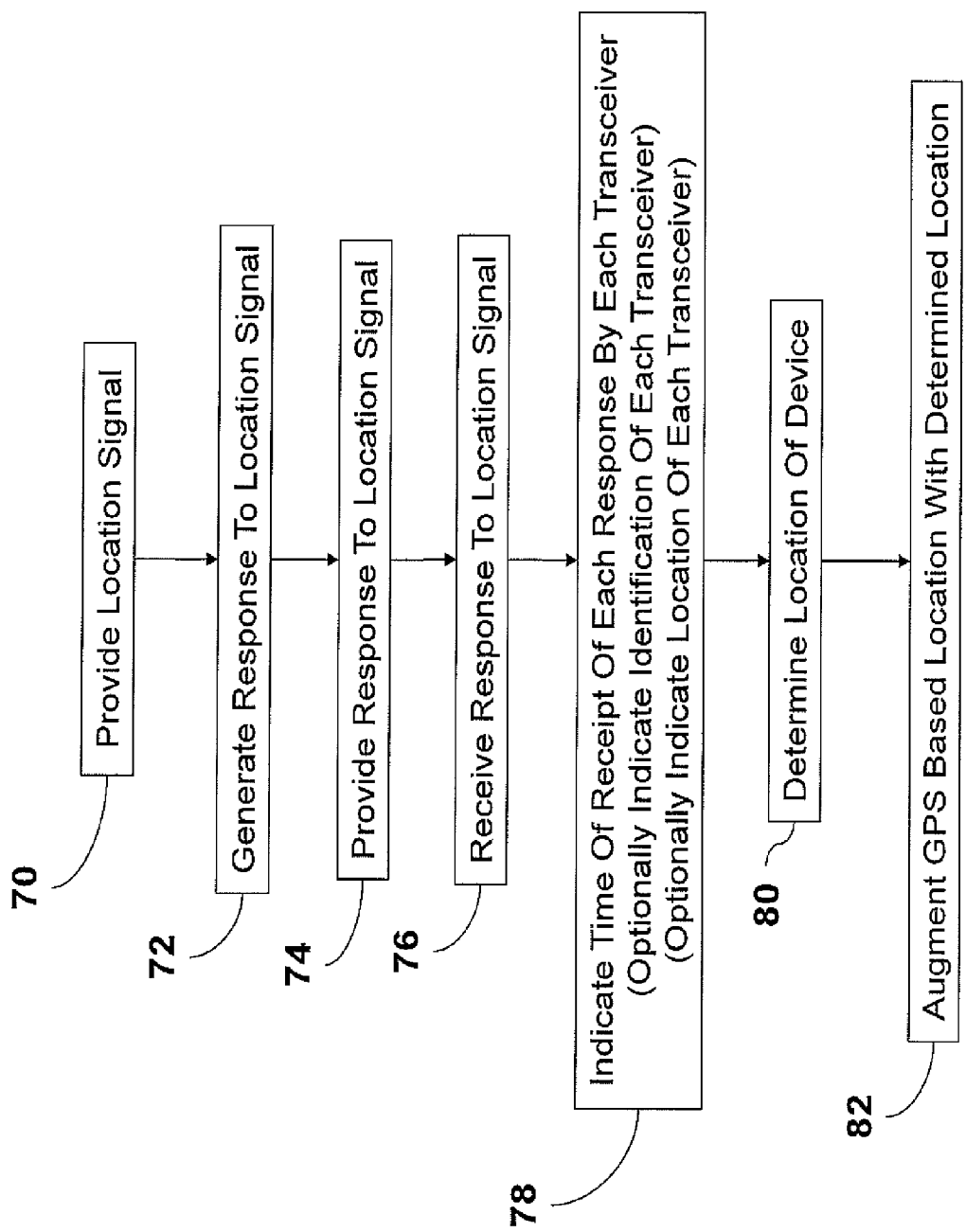
FIG. 5 is another example flow diagram of enhanced location based services. A location signal may be provided at step 70.

FIG. 5 is another example flow diagram of enhanced location based services. A location signal may be provided at step 70. The location signal may be generated by the GPS combine and distribute system 12 and/or by the GPS combine and distribute system 50. The location signal may be provided by each transceiver of a plurality of transceivers. In an example embodiment, as described herein, the location signal may be provided by each transceiver 18. A response to the provided location signal may be generated at step 72. In an example embodiment, as described herein, the response may be generated by the GPS combine and distribute system 12 and/or by the GPS combine and distribute system 50. In an example embodiment, as described herein, the response may be provided by the GPS combine and distribute system 12 and/or by the GPS combine and distribute system 50. The response may be received at step 76. The response may be received by transceivers of a plurality of transceivers. In an example embodiment, as described herein, the response may be received by each transceiver 18. Each transceiver receiving the response may indicate a time at which a respective response was received at step 78. Optionally, an indication of the transceiver receiving the response also may be indicated. Optionally, an indication of the location of a transceiver receiving the response also may be indicated. At step 80, the location of the device may be determined based on the time of receipt of each response and the location of each transceiver receiving a response. The location may be determined in any appropriate manner, such as, for example, via, time difference of arrival calculations, hyperbolic calculations, or the like. At step 82, the location of the device and/or the location of a GPS receiver may be augmented, as described herein, with the location determined at step 80 to determine an accurate location of the device.

Figure 6:
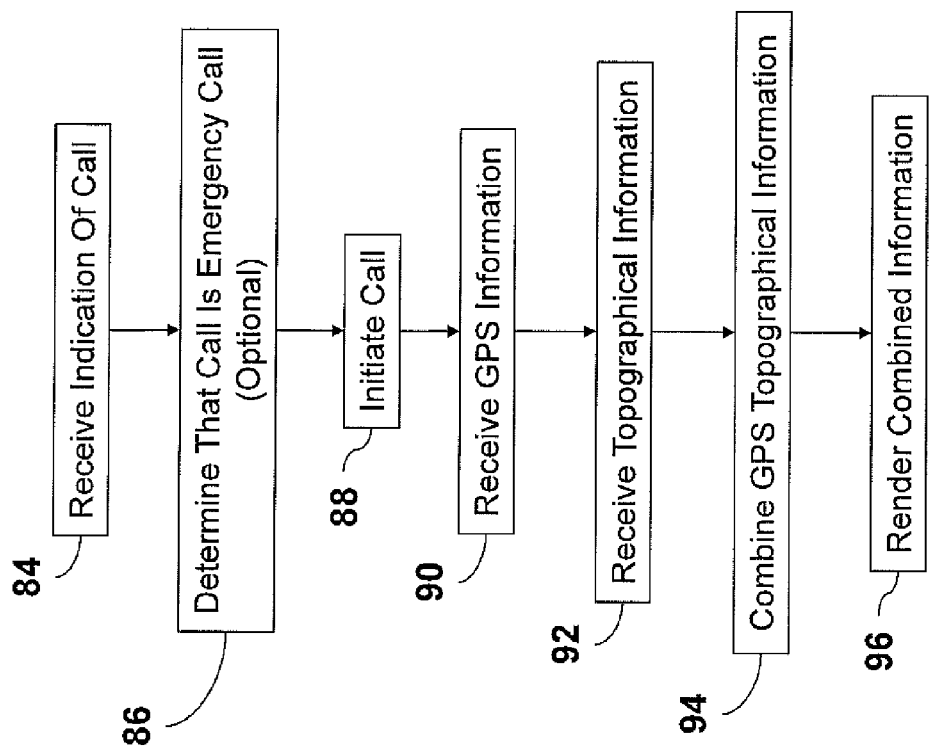
FIG. 6 is another example flow diagram of enhanced location based services.

FIG. 6 is another example flow diagram of enhanced location based services. An indication of a call may be received at step 84. The indication of the call may be received by any appropriate device. In an example embodiment, the indication of the call is received by the mobile device 16 and/or the GPS device 44 as described herein. The indication of the call may be any appropriate indication, such as, for example, dialed digits, a selection from a list of numbers, a selection from a list of contacts, a speed dial entry, a spoken entry, a mechanical entry, or the like, or any appropriate combination thereof. It may be determined, at step 86, that the call is an emergency call. An emergency call may comprise a 9-1-1 call (e.g., called number is 9-1-1), a call to a predetermined number, a call to a number that is determined to be related to an emergency call, or the like, or any appropriate combination thereof. Predetermined numbers may comprise, for example, a list of predetermined phone numbers such as a phone number of a fire department, a phone number of an ambulance, a phone number of a police station, a phone number of a hospital, a phone number of a relative (e.g., parent, child, etc.), or the like. In an example embodiment, when the call is initiated, the list of predetermined numbers may be compared to the number being called, and if a match exists, it may be determined that the call is an emergency call. In an example embodiment, when the call is initiated, the number being called may be used to query a database, a search engine, memory, or the like to determine if the number is associated with an emergency call. For example, the number may be used to search a directory to determine to whom the number is assigned. If the number is assigned to a hospital, a police station, an ambulance service, etc the call may be determined to be an emergency call.

The call may be initiated at step 88. The call may be initiated in any appropriate manner. For example, a user of a mobile device may select or speak "send," "call," or the like, GPS information may be received at step 90. In an example embodiment, a location of a device may be determined automatically when it is determined that a call being initiated by the mobile device is an emergency call. Thus, if this were the case, upon a device determining that the call is an emergency call (at step 86), the device may automatically initiate the call (at step 88) to receive location data. And the location data may be received at step 90. In an example embodiment, the location data comprises GPS data.

Topographical information may be received by the device at step 92. Topographic information may comprise any appropriate topographic information, such as, details pertaining to the location and height of a GPS antenna, topographic information of an indoor environment in which a DAS is located, topographic information of an outdoor environment in which a DAS may be located, construction drawings of an indoor environment in which the DAS is located, a blueprint of the indoor environment in which the DAS 14 is located, or the like, or any combination thereof. As described above, because a GPS antenna may have direct access to GPS satellites, the location of the GPS antenna may be accurate. Thus, the accurate location of the GPS antenna may be correlated with topographic information to provide an accurate location of the mobile device. Accordingly, location information (e.g., GPS information) pertaining to the surroundings of the source of the call (e.g., mobile device 16, GPS device 44) may be combined (e.g., correlated) with topographical information at step 94. The combined information may be rendered at step 96. In an example embodiment, the device may generate a map or the like indicating the location of the device with respect to the topographical information. The location of the device with respect to the topographical information may be rendered on the device. The location of the device with respect to the topographical information may be rendered in any appropriate manner, such as, for example, visually, audibly, mechanically (vibration), or any appropriate combination thereof. Thus, for example, the location of the device may be visually rendered on a display of the device as an overlay on a map or the like showing what floor, what corridor, what room, etc. the device is located. And, the location of the device may move along the map overlay as the device 16 moves. In an example embodiment, as described herein, the device may comprise the mobile device 16 and/or the GPS device 44.

Figure 7:
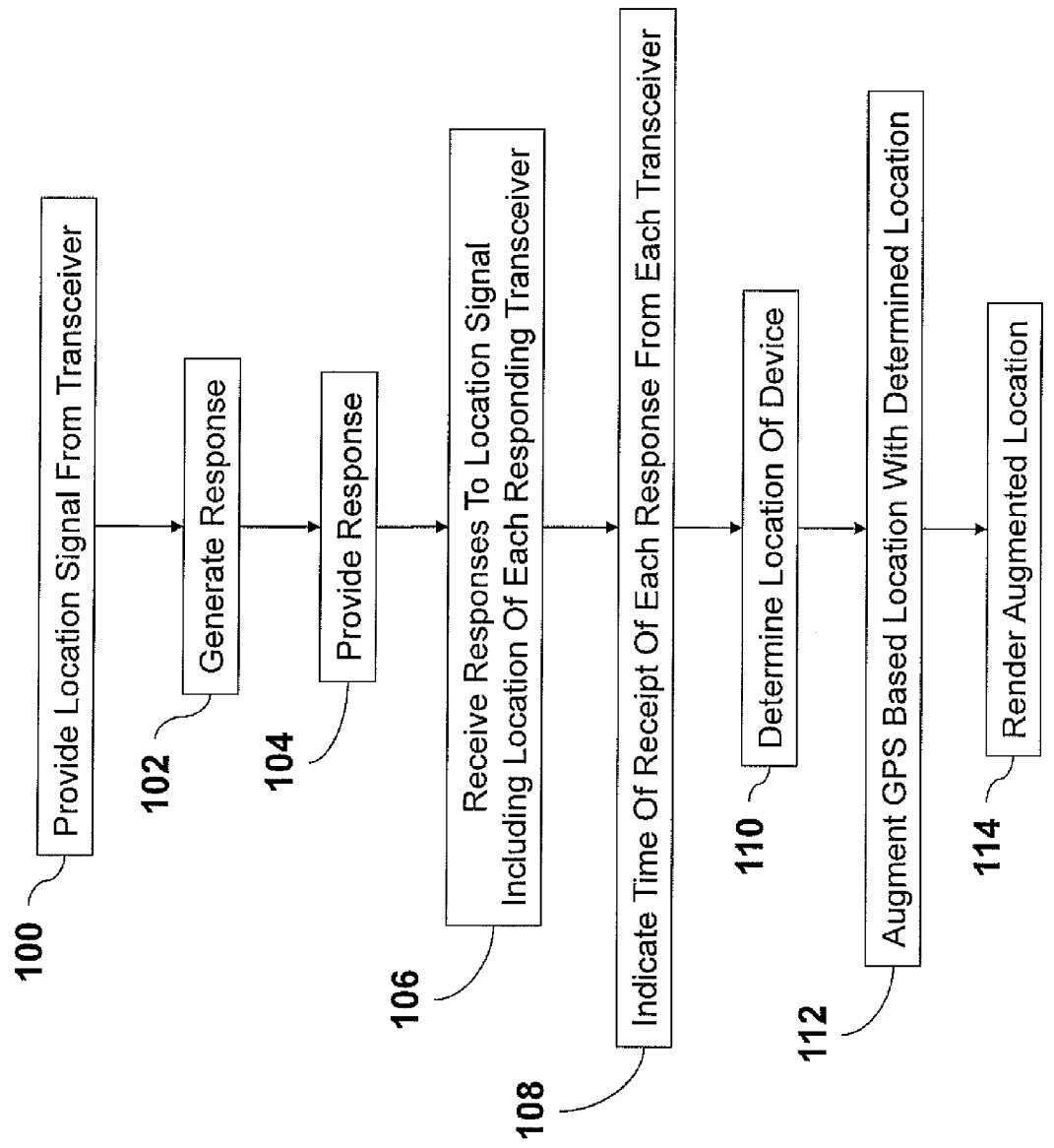
FIG. 7 is another example flow diagram of enhanced location based services.

FIG. 7 is another example flow diagram of enhanced location based services. A location signal may be provided be each transceiver of a plurality of transceivers at step 100. In an example embodiment, the transceivers may comprise transceivers 18 as described herein. The location signal may be generated by the device. In an example embodiment, the device may comprise the mobile device 16 and/or the GPS device 44 as described herein. The location signal may be received by at least one transceivers of a plurality of transceivers. In an example embodiment, the location signal may be received by at least one transceiver 18. A response to the provided location signal may be generated at step 102. The response may be generated by at least one transceivers of a plurality of transceivers (e.g., transceivers 18). Responses to the provided location signal may be provided at step 104. Responses may be provided by at least one transceiver of a plurality of transceivers (e.g., transceivers 18). The response may be received by the device at step 106. In an example embodiment, the responses include a location of the transceiver that sent the response. The device may indicate a time at which a respective response was received from each transceiver at step 108. At step 100, the location of the device may be determined based on the time of receipt of each response and the location of each transceiver providing a response. The location may be determined in any appropriate manner, such as, for example, via time difference of arrival calculations, hyperbolic calculations, or the like. At step 112, the location of the device and/or the location of a GPS receiver may be augmented, as described herein, with the location determined at step 110 to determine an accurate location of the device. The augmented location may be rendered at step 114. The augmented location may be rendered on any appropriated device in any appropriate format. For example, the location of the device may be visually rendered on a display of the mobile device 16 and/or the GPS device 44 as an overlay on a map or the like showing what floor, what corridor, what room, etc. the mobile device 16 and/or the GPS device is located. And, the location of the device may move along the map overlay as the device moves. The augmented location of the device may be rendered in any appropriate manner, such as, for example, visually, audibly, mechanically (vibration), or any appropriate combination thereof.

Figure 8:
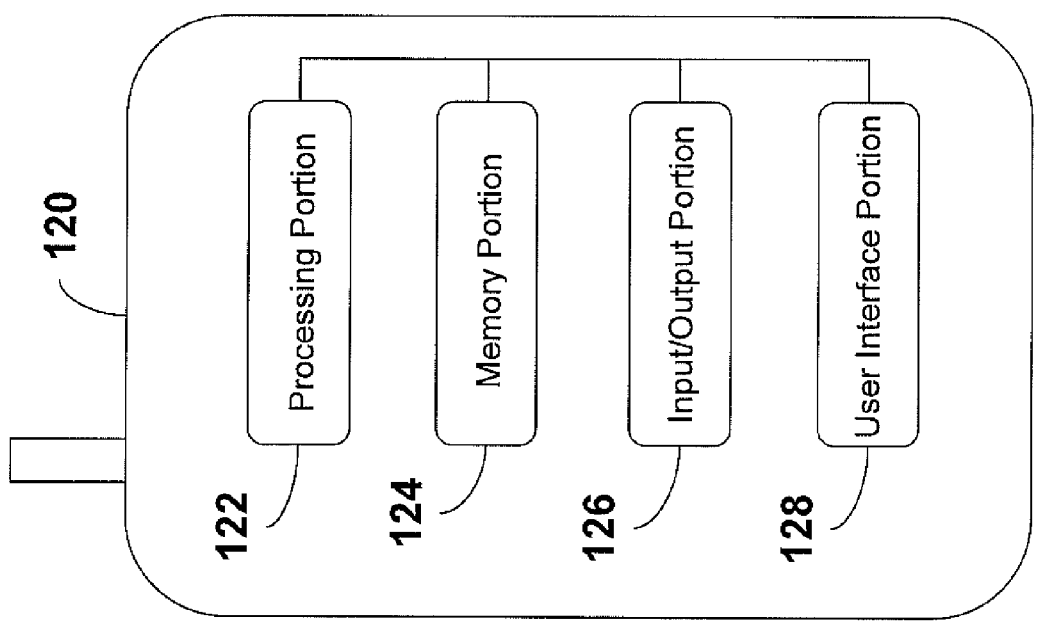
FIG. 8 is a block diagram of an example communications device 120 configured to facilitate enhanced location based services.

FIG. 8 is a block diagram of an example communications device 120 configured to facilitate enhanced location based services. In an example embodiment, the communications device 120 may comprise the mobile device 16 and/or the GPS device 44. In an example configuration, communications device 120 comprises a mobile wireless device. The communications device 120, however, may comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-UPS compatible device, etc.), or a combination thereof. The communications device 120 can include devices that are not typically thought of as portable, such as, for example, a public computing device, a navigation device installed in-vehicle, a set top box, or the like. The mobile communications device 120 can include non-conventional computing devices, such as, for example, a kitchen appliance, a motor vehicle control (e.g., steering wheel), etc., or the like. As evident from the herein description a communications device, a mobile device, or any portion thereof is not to be construed as software per se.

The communications device 120 may include any appropriate device, mechanism, software, and/or hardware for facilitating enhanced location based services as described herein. In an example embodiment, the ability to enhance location based services is a feature of the communications device 120 that can be turned on and off. Thus, in an example embodiment, an owner of the communications device 120 may opt-in or opt-out of this capability.

In an example embodiment, the communications device 120 comprises a processor and memory coupled to the processor. The memory may comprise executable instructions that when executed by the processor cause the processor to effectuate operations associated with enhanced location based services.

In an example configuration, the communications device 120 comprises a processing portion 122, a memory portion 124, an input/output portion 126, and a user interface (UI) portion 128. Each portion of the communications device 120 comprises circuitry for performing functions associated with each respective portion. Thus, each portion can comprise hardware, or a combination of hardware and software. Accordingly, each portion of the communications device 120 is not to be construed as software per se. It is emphasized that the block diagram depiction of communications device 120 is exemplary and not intended to imply a specific implementation and/or configuration. For example, in an example configuration, the communications device 120 may comprise a cellular phone and the processing portion 122 and/or the memory portion 124 may be implemented, in part or in total, on a subscriber identity module (SIM) of the mobile communications device 120. In another example configuration, the communications device 120 may comprise a laptop computer. The laptop computer can include a SIM, and various portions of the processing portion 122 and/or the memory portion 124 can be implemented on the SIM, on the laptop other than the SIM, or any combination thereof.

The processing portion 122, memory portion 124, and input/output portion 126 are coupled together to allow communications therebetween. In various embodiments, the input/output portion 126 comprises a receiver of the communications device 120, a transmitter of the communications device 120, or a combination thereof. The input/output portion 126 is capable of receiving and/or providing information pertaining to enhanced location based services as described herein. In various configurations, the input/output portion 126 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 122 may be capable of performing functions pertaining to enhanced location based services as described herein. In a basic configuration, the communications device 120 may include at least one memory portion 124. The memory portion 124 may comprise a storage medium having a tangible physical structure. Thus, the memory portion 124, as well as any computer-readable storage medium described herein, is not to be construed as a transient signal per se. Further, the memory portion 124, as well as any computer-readable storage medium described herein, is not to be construed as a propagating signal per se. The memory portion 124 may store any information utilized in conjunction with enhanced location based services as described herein. Depending upon the exact configuration and type of processor, the memory portion 124 may be volatile (such as some types of RAM), non-volatile (such as ROM, flash memory, etc.), or a combination thereof. The mobile communications device 120 may include additional storage (e.g., removable storage and/or non-removable storage) including but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 120.

The communications device 120 also may contain a user interface (UI) portion 128 allowing a user to communicate with the communications device 120. The UI portion 128 may be capable of rendering any information utilized in conjunction with enhanced location based services as described herein. The UI portion 128 may provide the ability to control the communications device 120, via, for example, buttons, soft keys, voice actuated controls, a touch screen, movement of the mobile communications device 120, visual cues (e.g., moving a hand in front of a camera on the mobile communications device 120), or the like. The UI portion 128 may provide visual information (e.g., via a display), audio information (e.g., via speaker), mechanically (e.g., via a vibrating mechanism), or a combination thereof. In various configurations, the UI portion 128 may comprise a display, a touch screen, a keyboard, an accelerometer, a motion detector, a speaker, a microphone, a camera, a tilt sensor, or any combination thereof. The UI portion 128 may comprise means for inputting biometric information, such as, for example, fingerprint information, retinal information, voice information, and/or facial characteristic information.

The UI portion 128 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the portion may comprise a user interface (UI) application. The application may interface with a client or operating system (OS) to, for example, facilitate user interaction with device functionality and data. The tri application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with enhanced location based services as described herein.

Figure 9:
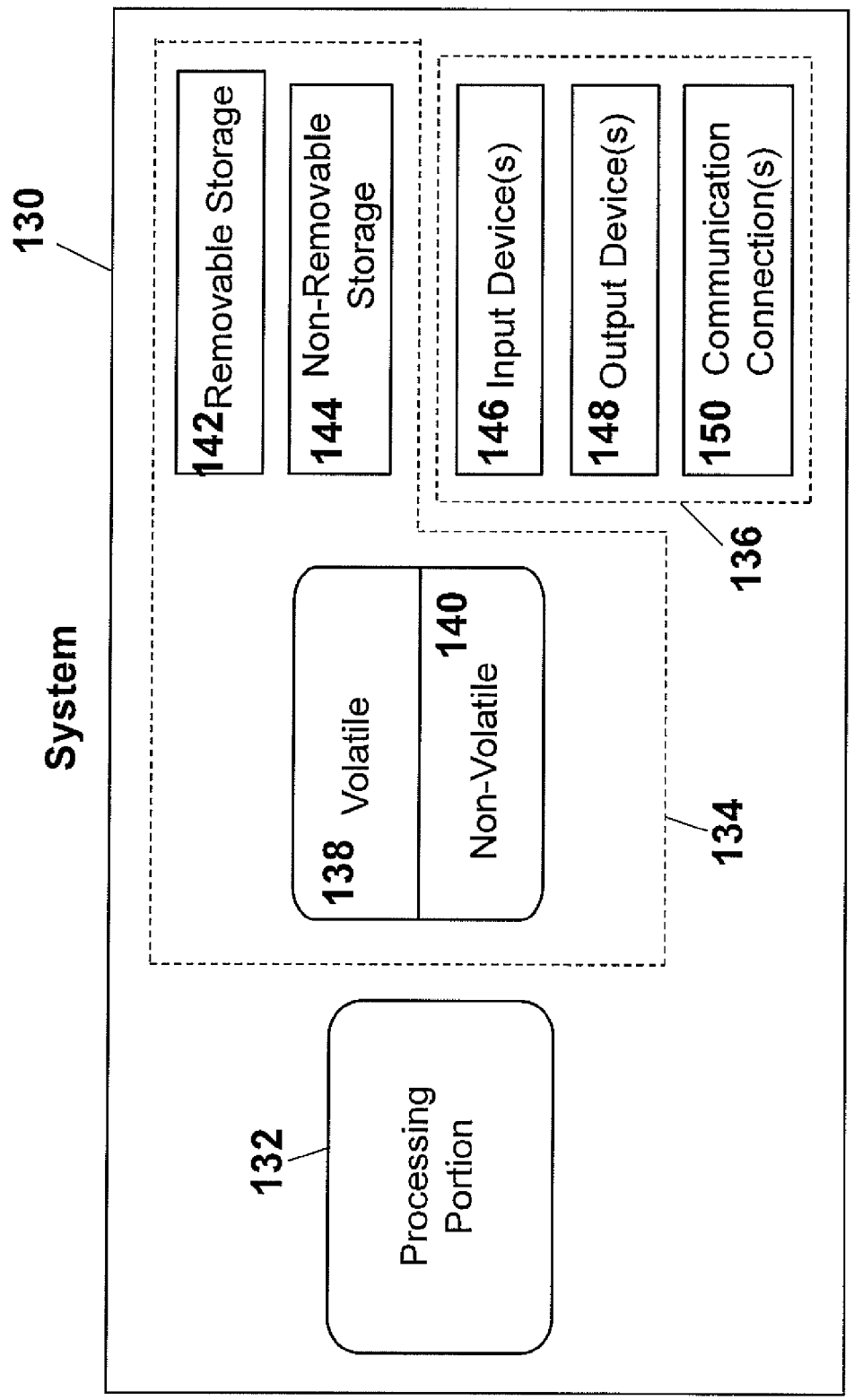
FIG. 9 is a block diagram of an example system 130 for facilitating enhanced location based services.

FIG. 9 is a block diagram of an example system 130 for facilitating enhanced location based services. The system 130 may comprise hardware or a combination of hardware and software. The functionality needed to facilitate enhanced location based services may reside in any one or combination of systems 130. The system 130 depicted in FIG. 9 may represent any appropriate system, or combination of apparatuses, such as a processor, a server, a gateway, a node, any appropriate entity, or any appropriate combination thereof. In an example embodiment, the system 130 may comprise the GPS combine and distribute system 12, the GPS combine and distribute system 50, or any appropriate combination thereof. It is emphasized that the block diagram depicted in FIG. 9 is exemplary and not intended to imply a specific implementation or configuration. Thus, the system 130 may be implemented in a single processor or multiple processors (e.g., single server or multiple servers, single gateway or multiple gateways, single system or multiple systems, etc.). Multiple systems may be distributed or centrally located. Multiple systems may communicate wirelessly, via hard wire, or a combination thereof.

In an example embodiment, the system 130 comprises a processor and memory coupled to the processor. The memory may comprise executable instructions that when executed by the processor cause the processor to effectuate operations associated with enhanced location based services. As evident from the herein description, a system or any portion thereof is not to be construed as software per se.

In an example embodiment, the system 130 comprises a processor and memory coupled to the processor. The memory may comprise executable instructions that when executed by the processor cause the processor to effectuate operations associated with enhanced location based services.

In an example configuration, the system 130 comprises a processing portion 132, a memory portion 134, and an input/output portion 136. The processing portion 132, memory portion 134, and input/output portion 136 are coupled together (coupling not shown in FIG. 9) to allow communications therebetween. The input/output portion 136 may be capable of receiving and/or providing information from/to a communications device and/or other network entities configured to be utilized with enhanced location based services. For example, the input/output portion 136 may include a wireless communications (e.g., 2.5G/3G/4G/GPS) card. The input/output portion 136 may be capable of receiving and/or sending video information, audio information, control information, image information, data, or any combination thereof. In an example embodiment, the input/output portion 36 may be capable of receiving and/or sending information to determine a location of the system 130 and/or the communications device 30. In an example configuration, the input/output portion 136 may comprise and/or be coupled to a GPS receiver. In an example configuration, the system 130 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 136 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 132 may be capable of performing functions associated with enhanced location based services as described herein. That is, a communications device (e.g., communications device 120) may perform functions internally (by the device) and/or utilize the system 130 to perform functions. For example, the processing portion 132 may be capable of, in conjunction with any other portion of the system 130, installing an application for enhanced location based services, processing an application for enhanced location based services, configuring the system 130 to function as a gateway for other devices to a network, determining the location at which to provide enhanced location based services, or the like, or any combination thereof. The processing portion 132, in conjunction with any other portion of the system 130, enables the system 130 to covert speech to text when it is configured to enhance location based services.

In a basic configuration, the system 130 may include at least one memory portion 134. The memory portion 134 may comprise a storage medium having a tangible physical structure. Thus, the memory portion 134, as well as any computer-readable storage medium described herein, is not to be construed as a transient signal per se. The memory portion 134, as well as any computer-readable storage medium described herein, is not to be construed as a propagating signal per se. The memory portion 134 may store any information utilized in conjunction with enhanced location based services as described herein. Depending upon the exact configuration and type of processor, the memory portion 134 may be volatile 138 (such as some types of RAM), non-volatile 140 (such as ROM, flash memory, etc.), or a combination thereof. The system 130 may include additional storage (e.g., removable storage 142 and/or non-removable storage 144) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the system 130.

The system 130 also may contain communications connection(s) 150 that allow the system 130 to communicate with other devices, systems, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The system 130 also can include input device(s) 146 such as keyboard, mouse, pen, voice input device, touch input device, etc. Output device(s) 148 such as a display, speakers, printer, etc. also can be included.

Enhanced location based service may be implemented in conjunction with various wireless communications networks. Some of which are described below.

Figure 10:
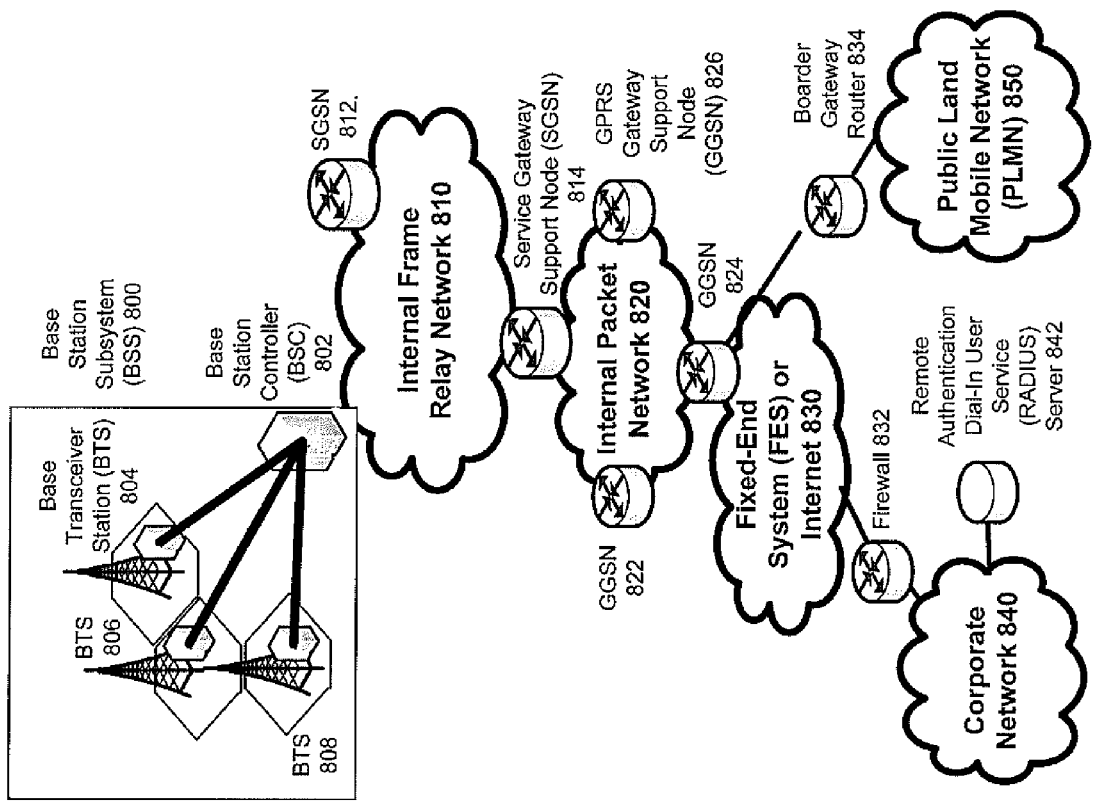
FIG. 10 depicts an overall block diagram of an example packet-based mobile cellular network environment, such as a GPRS network, within which enhanced location based services may be implemented.

FIG. 10 depicts an overall block diagram of an example packet-based mobile cellular network environment, such as a GPRS network, within which enhanced location based services may be implemented. In the example packet-based mobile cellular network environment shown in FIG. 10, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 11:
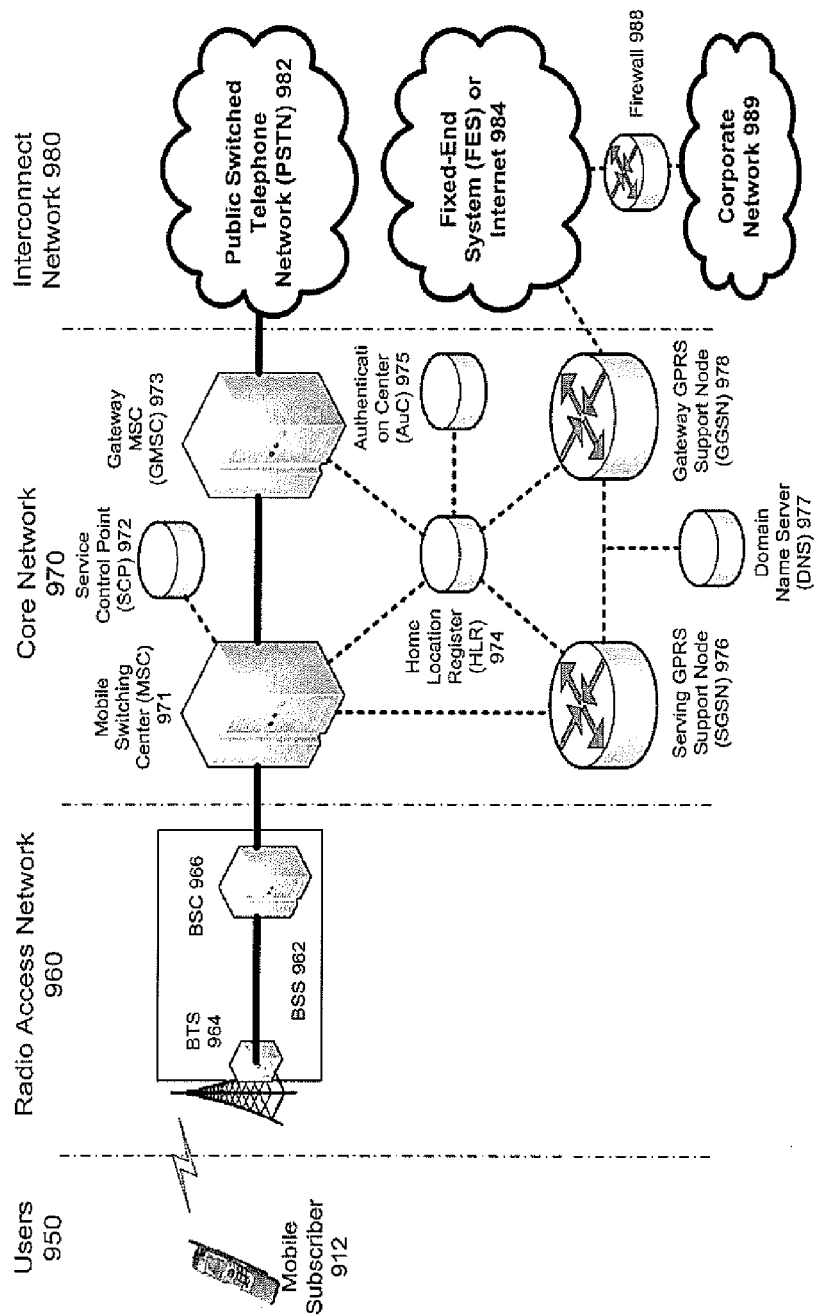
FIG. 11 illustrates an architecture of a typical GPRS network within which text message generation for emergency services can be implemented.

FIG. 11 illustrates an architecture of a typical GPRS network within which text message generation for emergency services can be implemented. The architecture depicted in FIG. 11 is segmented into four groups: users 950, radio access network 960, core network 970, and interconnect network 980. Users 950 comprise a plurality of end users. Note, device 912 is referred to as a mobile subscriber in the description of network shown in FIG. 11. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 11, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 11, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network, HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 11, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 12:
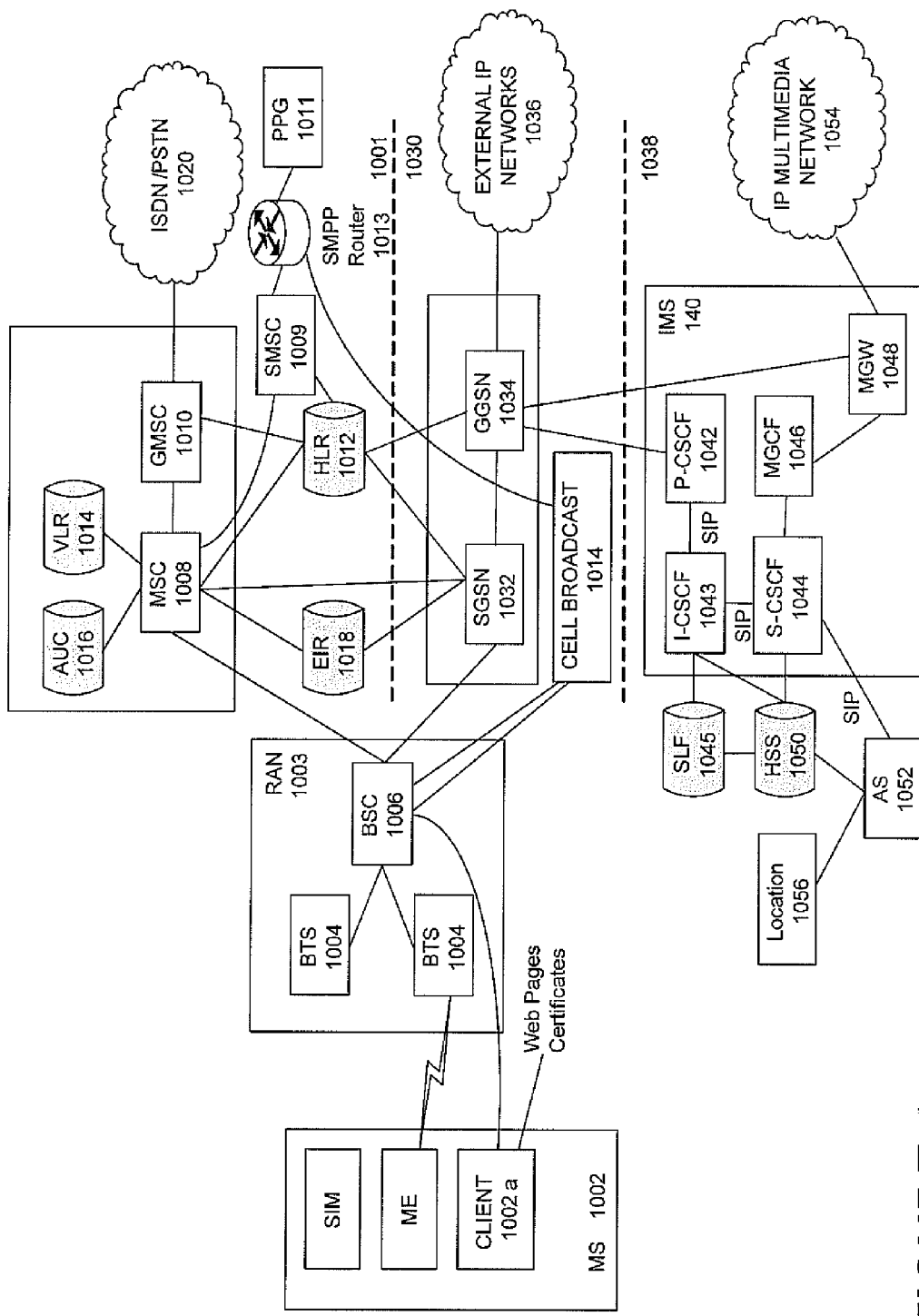
FIG. 12 illustrates an example block diagram view of a GSM/GPRS/IP multimedia network architecture within which text message generation for emergency services may be implemented.

FIG. 12 illustrates an example block diagram view of a GSM/GPRS/IP multimedia network architecture within which text message generation for emergency services may be implemented. As illustrated, the architecture of FIG. 12 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VIA 1014, together with the MSC 1008, provide the call routing and roaming capabilities of GSM. The AuC 1016 provides the parameters needed for authentication and encryption functions. Such parameters allow verification of a subscriber's identity. The aft 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-1P network 1036, such as an X.25 network or the Internet. In order to access GPRS services, the MS first attaches itself to the GPRS network by performing; an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HISS) 1050. The HISS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 13:
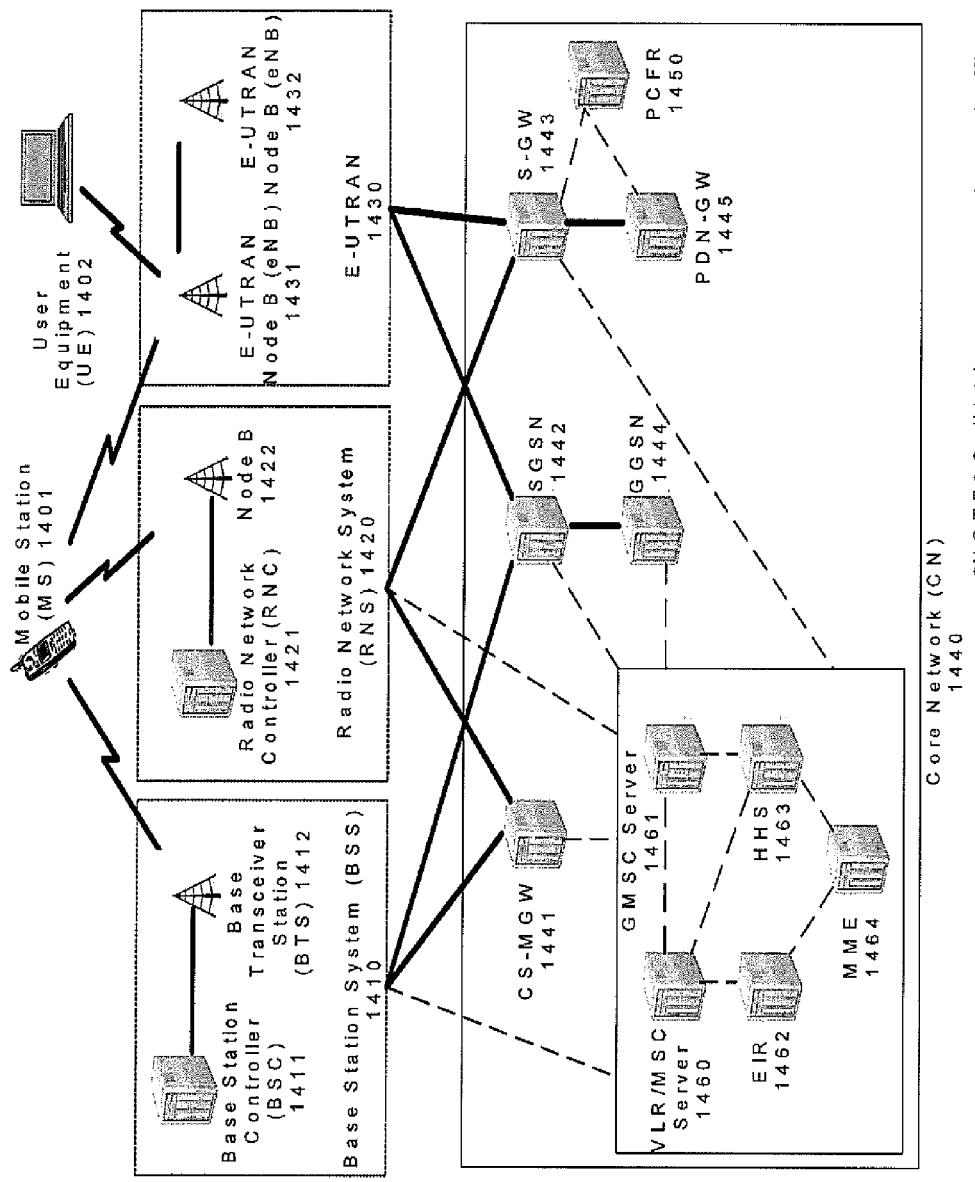
FIG. 13 illustrates a PLMN block diagram view of an example architecture in which text message generation for emergency services may be incorporated.

FIG. 13 illustrates a PLMN block diagram view of an example architecture in which text message generation for emergency services may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1112. BSS 1410 may include a single BSC 1411/BTS 1412 pair (Base Station) or a system of BSC/BTS pairs which are part of a larger network, BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UNITS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432, E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 13 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network, EDGE may be implemented on any GSM network capable of hosting a GPRS network, making it an ideal upgrade aver GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430, in a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber identity (MST), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area, A VLR, and MSC Server may be located in the same computing environment, as is shown by VLR/MSC Server 1460, or alternatively may be located in separate computing environments. A VLR my contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of enhanced location based services have been described in connection with various computing devices/processors, the underlying concepts may be applied to any computing device, processor, or system capable of implementing enhanced location based services. The various techniques described herein can be implemented in connection with hardware or software or, where appropriate, with a combination of both. Thus, the methods and apparatuses of using and implementing enhanced location based services may be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. A computer-readable storage medium is not a propagating signal per se. When the program code is loaded into and executed by a machine, such as a computer, the machine becomes an apparatus for implementing enhanced location based services. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for using and implementing enhanced location based services also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing enhanced location based services. When implemented on a general-purpose processor, the program code combines with the processor to provide a unique apparatus that operates to invoke the functionality of enhanced location based services.

While enhanced location based services have been described in connection with the various embodiments of the various figures, it is to be understood that other similar embodiments can be used or modifications and additions can be made to the described embodiments for implementing enhanced location based services without deviating therefrom. For example, one skilled in the art will recognize that enhanced location based services as described in the present application may apply to any environment, whether wired or wireless, and may be applied to any number of such devices connected via a communications network and interacting across the network. Therefore, enhanced location based services should not be limited to any single embodiment, but rather should be construed in breadth and scope in accordance with the appended claims.

What is claimed:

1. A device comprising:
   a processor; and
   memory coupled to the processor, the memory comprising executable instructions that when executed by the processor cause the processor to effectuate operations comprising:
   receiving an indication of a call;
   responsive to receiving the indication of the call, obtaining location information pertaining to a location of a source of the call;
   providing a location signal;
   receiving, from a plurality of transceivers, a respective plurality of responses to the provided location signal;
   determining a time at which each response of the plurality of response was received;
   determining a location of each of the plurality of transceivers;
   determining a calculated location of the source based on the determined time at which each response of the plurality of response was received and the location of each of the plurality of transceivers;
   augmenting the location information with the calculated location;
   receiving information to be distributed via a distributed antenna system;
   generating combined information by combining the received location information and the information to be distributed via the distributed antenna system; and
   providing the combined information via the distributed antenna system.

2. The device of claim 1, wherein the location information comprising signals from a global position system satellite.

3. The device of claim 1, wherein:
   an intended recipient of the location information is a mobile device; and
   an intended recipient of the information to be distributed via the distributed antenna system is not the mobile device.

4. The device of claim 1, the operations further comprising:
incorporating topographical information pertaining to an environment proximate to the source of the call into the combined information.

5. The device of claim 4, wherein the topographical information comprises a blueprint of the environment proximate to the source of the call.

6. The device of claim 4, wherein the topographical information comprises a location of a global positioning antenna from which the location information was sent.

7. A device comprising:
a processor; and
memory coupled to the processor, the memory comprising executable instructions that when executed by the processor cause the processor to effectuate operations comprising:
initiating a call;
responsive to initiating the call, receiving location information pertaining to a location of the device;
providing a location signal;
receiving, from a plurality of transceivers, a respective plurality of responses to the provided location signal;
determining a time at which each response of the plurality of response was received;
determining a location of each of the plurality of transceivers;
determining a calculated location of the device based on the determined time at which each response of the plurality of response was received and the location of each of the plurality of transceivers;
augmenting the location information with the calculated location;
receiving topographical information pertaining to an environment proximate to the device;
combining the location information with the topographical information; and
rendering an indication of the combined information.

8. The device of claim 7, wherein the location information comprising signals from a global position system satellite.

9. The device of claim 7, wherein the topographical information comprises a blueprint of the environment proximate to the source of the call.

10. The device of claim 7, wherein the topographical information comprises a location of a global positioning antenna from which the location information was sent.

11. The device of claim 7, wherein:
the indication of the combined information is rendered visually as an overlay of a visual representation of the topographical information.

12. A computer-readable storage medium comprising executable instructions that when executed by a processor cause the processor to effectuate operation comprising:
receiving an indication of a call;
responsive to receiving the indication of the call, obtaining location information pertaining to a location of a source of the call;
providing a location signal;
receiving, from a plurality of transceivers, a respective plurality of responses to the provided location signal;
determining a time at which each response of the plurality of response was received;
determining a location of each of the plurality of transceivers;
determining a calculated location of the source based on the determined time at which each response of the plurality of response was received and the location of each of the plurality of transceivers;
augmenting the location information with the calculated location;
receiving information to be distributed via a distributed antenna system;
generating combined information by combining the received location information and the information to be distributed via the distributed antenna system; and
providing the combined information via the distributed antenna system.

13. The computer-readable storage medium of claim 12, wherein the location information comprising signals from a global position system satellite.

14. The computer-readable storage medium of claim 12, wherein:
an intended recipient of the location information is a mobile device; and
an intended recipient of the information to be distributed via the distributed antenna system is not the mobile device.

15. The computer-readable storage medium of claim 12, the operations further comprising:
incorporating topographical information pertaining to an environment proximate to the source of the call into the combined information.

16. The computer-readable storage medium of claim 15, wherein the topographical information comprises a blueprint of the environment proximate to the source of the call.

17. The computer-readable storage medium of claim 15, wherein the topographical information comprises a location of a global positioning antenna from which the location information was sent.

* * * * *